(12) United States Patent
Sakurai

(10) Patent No.: US 9,706,844 B2
(45) Date of Patent: Jul. 18, 2017

(54) RECLINING DEVICE

(71) Applicant: SHIROKI CORPORATION, Fujisawa-shi (JP)

(72) Inventor: Noriyuki Sakurai, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 14/915,615

(22) PCT Filed: Sep. 2, 2014

(86) PCT No.: PCT/JP2014/073063
§ 371 (c)(1),
(2) Date: Feb. 29, 2016

(87) PCT Pub. No.: WO2015/037476
PCT Pub. Date: Mar. 19, 2015

(65) Prior Publication Data
US 2016/0227930 A1 Aug. 11, 2016

(30) Foreign Application Priority Data
Sep. 13, 2013 (JP) ................... 2013-190315

(51) Int. Cl.
*B60N 2/02* (2006.01)
*A47C 1/024* (2006.01)
(Continued)

(52) U.S. Cl.
CPC ............ *A47C 1/024* (2013.01); *B60N 2/2252* (2013.01); *B60N 2/2254* (2013.01); *F16D 59/02* (2013.01); *F16D 63/006* (2013.01); *F16H 35/00* (2013.01)

(58) Field of Classification Search
CPC .... A47C 1/024; B60N 2/2252; B60N 2/2254; F16D 59/02; F16D 63/006; F16D 35/00
(Continued)

(56) References Cited

U.S. PATENT DOCUMENTS 5,308,294 A * 5/1994 Wittig ................. B60N 2/2252
297/362
5,634,380 A * 6/1997 Scholz ................ B60N 2/2252
297/362
(Continued)

FOREIGN PATENT DOCUMENTS

| JP | 2009-207702 A | 9/2009 |
|---|---|---|
| JP | 2011-255214 A | 12/2011 |
| JP | 2012-056530 A | 3/2012 |

OTHER PUBLICATIONS

International Search Report (ISR) (PCT Form PCT/ISA/210), in PCT/JP2014/073063, dated Dec. 2, 2014.

*Primary Examiner* — Laurie K Cranmer
(74) *Attorney, Agent, or Firm* — McGinn IP Law Group, PLLC

(57) ABSTRACT

Provided is a reclining device that prevents a seat back from falling rearward all at once when reclined rearward. The reclining device has an external gear (63), which has a cylinder (63c) at the center, an internal gear (61), which has internal teeth that engage with the external gear (63) and a circular hole (61e) in which the cylinder (63c) is inserted, and a first wedge-shaped member (71) and a second wedge-shaped member (73), which are provided between the inner surface of the circular hole (61e) and the outer surface of the cylinder (63c). The reclining device is configured such that a load from the seat back is simultaneously applied to the first wedge-shaped member (71) and second wedge-shaped member (73).

3 Claims, 12 Drawing Sheets

(51) Int. Cl.
*F16D 59/02* (2006.01)
*F16H 35/00* (2006.01)
*B60N 2/225* (2006.01)
*F16D 63/00* (2006.01)

(58) Field of Classification Search
USPC .................................. 297/367 R, 362, 374
See application file for complete search history.

(56) References Cited

U.S. PATENT DOCUMENTS

| | | | |
|---|---|---|---|
| 6,619,743 B1* | 9/2003 | Scholz | B60N 2/225 |
| | | | 297/362 |
| 7,281,765 B2* | 10/2007 | Scholz | B60N 2/2254 |
| | | | 297/362 |
| 7,322,654 B2* | 1/2008 | Kawashima | B60N 2/2254 |
| | | | 297/362 |
| 7,731,289 B2* | 6/2010 | Matsumoto | B60N 2/2254 |
| | | | 297/362 |
| 8,128,169 B2* | 3/2012 | Narita | B60N 2/0232 |
| | | | 297/362 |
| 8,540,317 B2* | 9/2013 | Stilleke | B60N 2/2252 |
| | | | 297/362.11 |
| 8,950,811 B2* | 2/2015 | Narita | B60N 2/2252 |
| | | | 297/362 |
| 2006/0158012 A1 | 7/2006 | Kawashima | |
| 2009/0224588 A1 | 9/2009 | Matsumoto et al. | |

\* cited by examiner

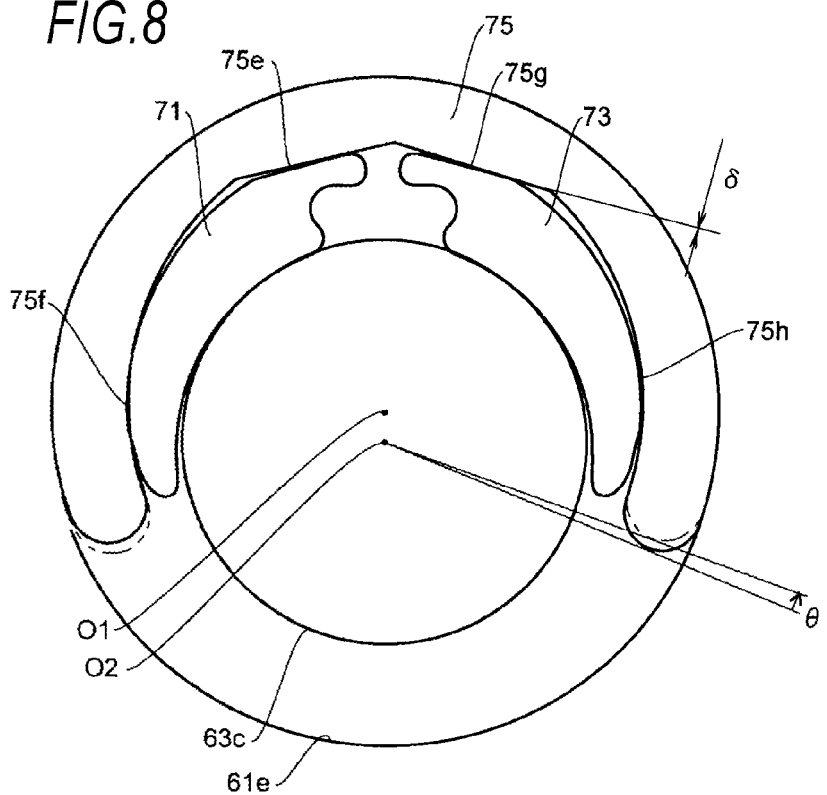
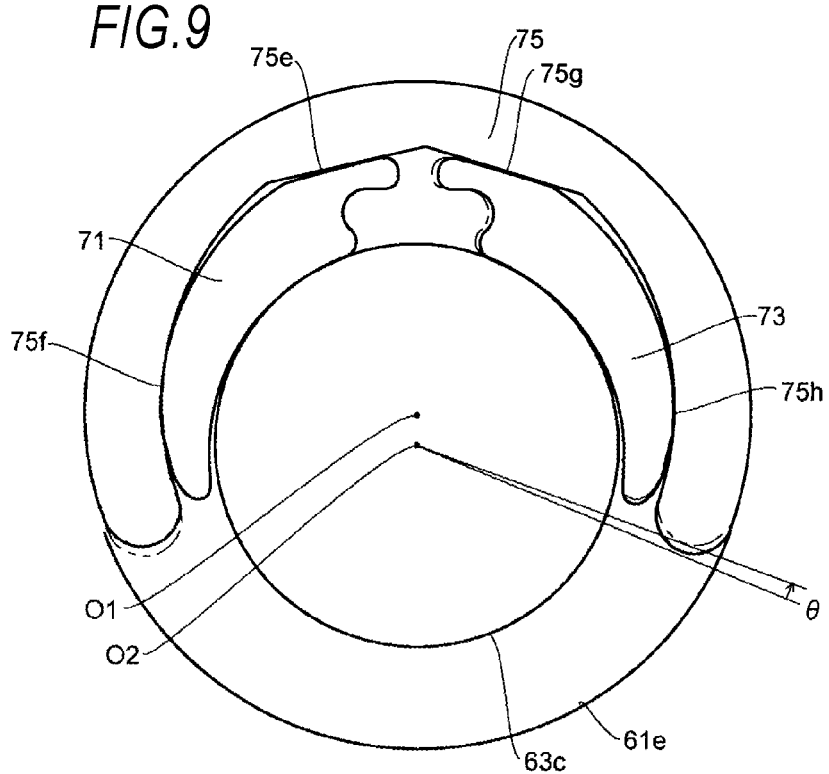

FIG.13        - PRIOR ART -
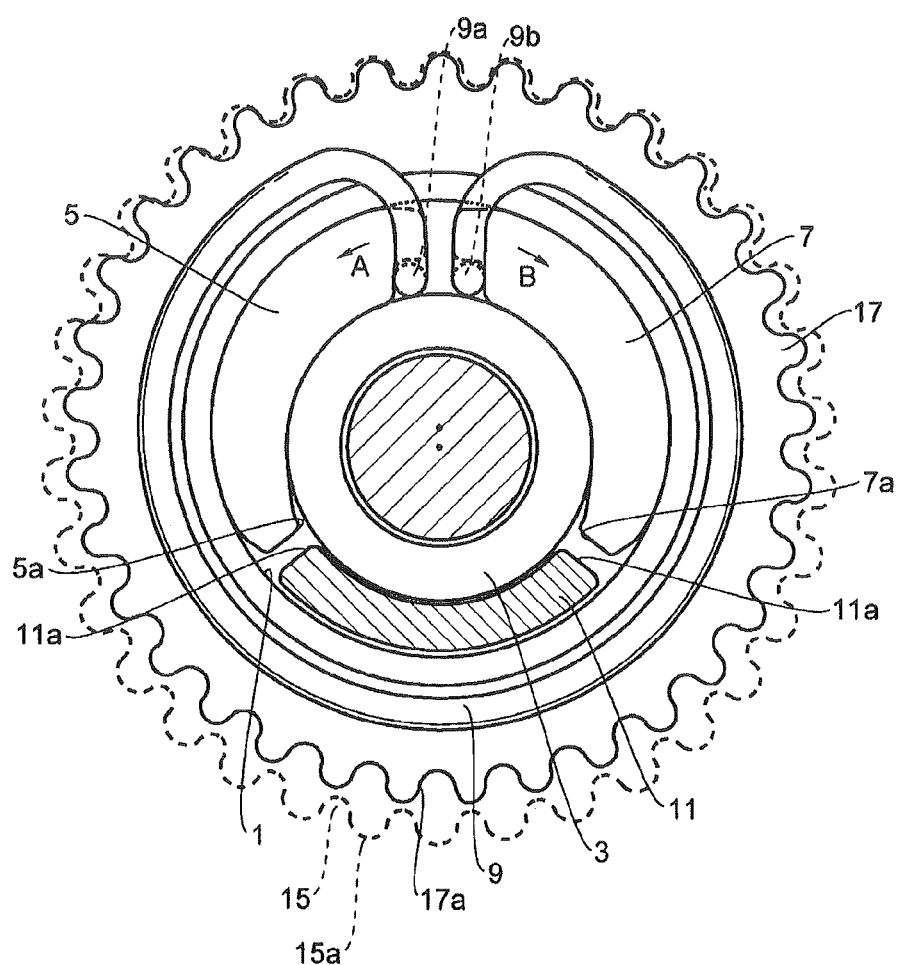

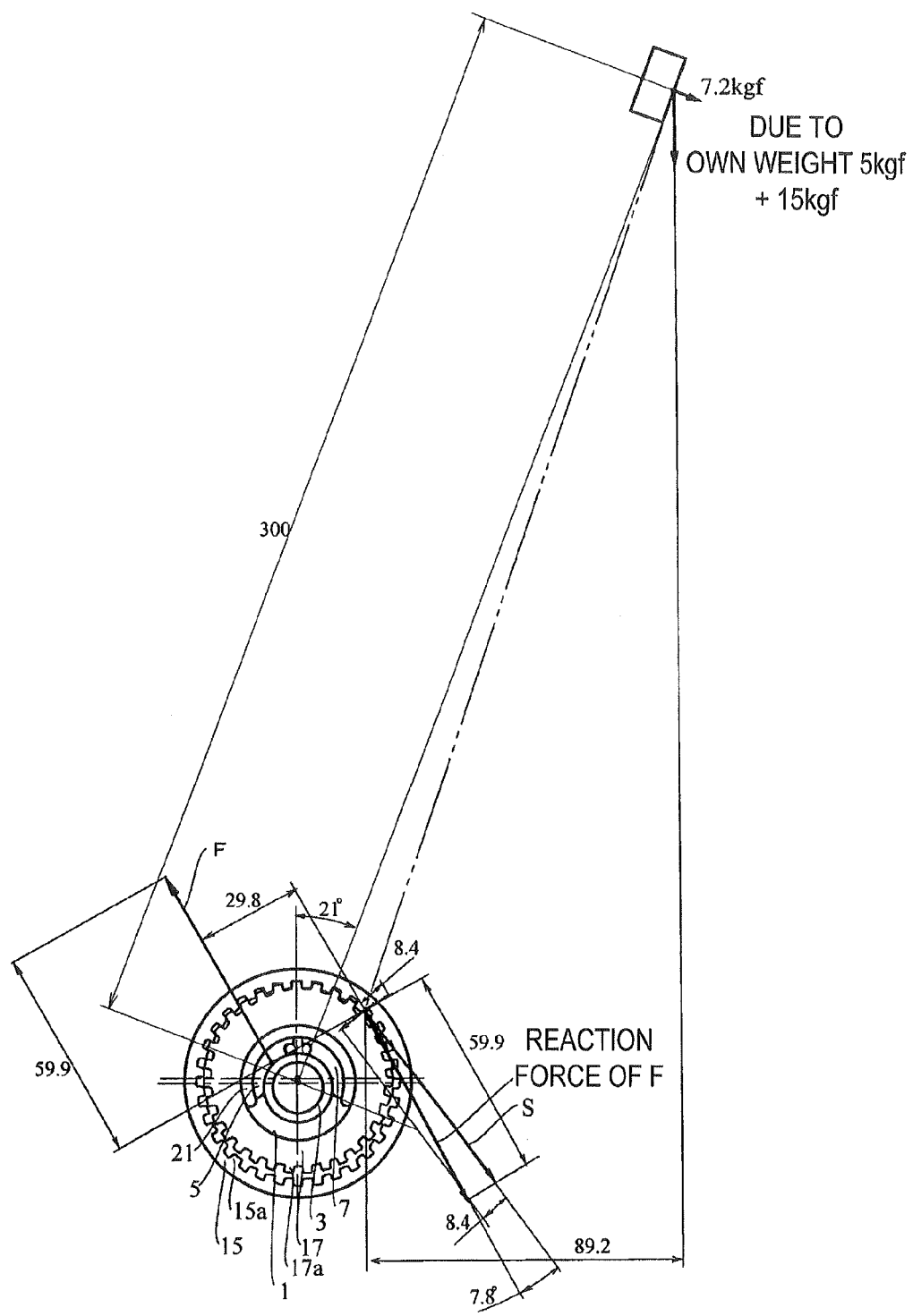
FIG.14 - PRIOR ART -

RECLINING DEVICE

TECHNICAL FIELD

The present invention relates to a reclining device for changing a tilt angle of a seat back relative to a seat cushion.

BACKGROUND ART

As shown in FIG. 13, there is known a reclining device that includes an internal gear 15 and an external gear 17. For example, the internal gear 15 is provided in a seat back, and the external gear 17 is provided in a seat cushion. The number of teeth of the external gear 17 is less than that of the internal gear 15, and the external gear 17 is engaged with the internal gear 15. The reclining device is configured to eccentrically move one of the internal gear 15 and the external gear 17 around a rotation axis of the other gear and to change the engagement position of the internal gear and the external gear, thereby changing a tilt angle of the seat back relative to the seat cushion.

FIG. 13 is a view showing the internal gear 15 and the external gear 17. The internal gear 15 is a dish-shaped member. The internal gear 15 has a bottom surface, at the back side of the paper surface of FIG. 13, and a ring-shaped rib extending, toward the front from the paper surface, is provided in an outer peripheral edge of the bottom surface. Internal teeth 15a are provided on the rib. Further, a cylindrical part 3 extending toward the front from the paper surface is provided in the bottom surface of the internal gear 15.

The ring-shaped external gear 17 is provided between the internal teeth 15a of the internal gear 15 and the cylindrical part 3. External teeth 17a are provided on an outer peripheral surface of the external gear 17. A circular hole 1 is formed by an inner peripheral surface of the external gear 17.

As shown in FIG. 13, an eccentric annular space is formed between an inner surface of the circular hole 1 of the external gear 17 and an outer surface of the cylindrical part 3 of the internal teeth 15. A first wedge-shaped member 5 and a second wedge-shaped member 7 are arranged in the eccentric annular space. The first wedge-shaped member 5 and the second wedge-shaped member 7 are urged by a spring 9 in a direction (a direction of an arrow A and a direction of an arrow B) in which a wedge is driven into the eccentric annular space.

When the first wedge-shaped member 5 and the second wedge-shaped member 7 are pressed against the inner surface of the circular hole 1 and the outer surface of the cylinder part 3, the internal gear 15 and the external gear 17 are urged in a direction in which the amount of eccentricity between the rotation axes of both is increased. In this way, the internal teeth 15a of the internal gear 15 and the external teeth 17a of the external gear 17 are deeply engaged, so that so that the seat back is not tilted (locked state: non-operation state).

An unlocking cam 11 is configured such that an abutting surface 11a presses an end surface 5a or an end surface 7a on the wedge tip side of the first wedge-shaped member 5 and the second wedge-shaped member 7 against an urging force of the spring 9, and the first wedge-shaped member 5 or the second wedge-shaped member 7 are pressed in a direction in which the wedge-shaped members are pulled out (a direction opposite to the driving direction: a direction opposite to the direction of the arrow A or the arrow B). When the first wedge-shaped member 5 or the second wedge-shaped member 7 is moved by being pressed by the unlocking cam 11, a press-contact force of the first wedge-shaped member 5 or the second wedge-shaped member 7 to the inner surface of the circular hole 1 and the outer surface of the cylindrical part 3 is decreased. In this way, the engagement between the internal teeth and the external teeth becomes shallow, so that the seat back is in a tiltable state.

At the start of movement of one of the first wedge-shaped member 5 and the second wedge-shaped member 7, the other of the second wedge-shaped member 7 and the first wedge-shaped member 5 remains stationary by friction between the inner surface of the circular hole 1 and the outer surface of the cylindrical part 3. However, as the one of the wedge-shaped members moves in the pull-out direction, the other wedge-shaped member moves all at once by an elastic repulsive force of the spring 9 in a direction in which the wedge is driven into the eccentric annular space. As the above operation is repeated, an eccentric state between the internal gear and the external gear is maintained and the engagement location is changed, so that the seat back is tilted (unlocked state: operation state) (e.g., see Patent literature 1).

Now, in a seat using a conventional reclining device, a force applied to the reclining device will be described with reference to FIG. 14. In addition, in FIG. 14, the same parts as in FIG. 13 are denoted by the same reference numerals, and a duplicated description thereof is omitted. The reclining device shown in FIG. 14 is different from the device shown in FIG. 13 in that a drive ring 21 is provided. The drive ring 21 is movably provided between the inner surface of the circular hole 1, and the first wedge-shaped member 5 and the second wedge-shaped member 7. The drive ring 21 has an abutting portion which is abutted against the first wedge-shaped member 5 and the second wedge-shaped member 7. The first wedge-shaped member 5 and the second wedge-shaped member 7 are clamped by the drive ring 21 and the outer surface of the cylindrical part 3.

In the reclining device shown in FIG. 14, there is an assumed case where:

the internal gear 15 (cylindrical part 3) is provided in the seat back;

the external gear 17 (hole 1) is provided in the seat cushion;

an inclined state of the seat back corresponds to the state of being inclined in an angle of 21 degrees rearward from a vertical state;

a vertical downward load applied to the seat back due to its own weight is 5 kgf;

a vertical downward load applied to the seat back due to a seated person is 15 kgf; and a horizontal distance between an engagement position of the internal gear 15 and the external gear 17 and a point of action of the load applied to the seat back is 89.2 mm.

In this case, a moment applied to the engagement position of the internal teeth 15a and the external teeth 17a is expressed as 89.2 mm×20 kgf=1784 kgf·mm.

In the conventional reclining device shown in FIG. 14, pressure angles of the internal teeth 15a and the external teeth 17a are set so as to prevent slippage between the teeth surfaces of the internal teeth 15a and the teeth surfaces of the external teeth 17a when a load from the seat back is applied to the engagement position. Therefore, the load (force) from the seat back, which is applied to the engagement position, is transmitted in this order in the path of the cylindrical part 3 of the internal gear 15, the first wedge-shaped member 5, the circular hole 1 of the external gear 17, and the seat cushion.

Since in a direction perpendicular to a force applied to the first wedge-shaped member 5 from the cylindrical part 3 of the internal gear 15, a distance between a point of action of the force and an engagement position of the internal gear 15 and the external gear 17 is 29.8 mm, a force F transmitted to the external gear 17 from the first wedge-shaped member 5 becomes F=1784/29.8=59.86 kgf At this time, at the engagement position, a force (a component of a reaction force F shown in the figure) of causing the internal teeth 15a and the external teeth 17a to be slipped is expressed as follows.

(A perpendicular force(S) to the teeth surfaces of a reaction force of F occurring at the engagement position×tan (7.8 degrees))=(the perpendicular force(S) to the teeth surfaces of the reaction force of F occurring at the engagement position×0.137).

Generally, a coefficient (μ) of static friction at the engagement position of the teeth and the teeth is 0.2. Therefore, the maximum static frictional force is equal to (the perpendicular force(S) to the teeth surfaces of the reaction force of F occurring at the engagement position×0.2).

At the engagement position, the force of causing the internal teeth 15a and the external teeth 17a to be slipped is less than the maximum static frictional force. Therefore, the slippage between the internal teeth 15a and the external teeth 17a at the engagement position does not occur.

CITATION LIST

Patent Literature

Patent literature 1: Japanese Patent Laid-Open Publication No. 2012-56530

SUMMARY

Technical Problem

However, the reclining device configured as shown in FIG. 14 has the following problems.

All of the force (F) applied to the engagement position is transmitted to the seat cushion via the first wedge-shaped member 5, so that no load is applied to the second wedge-shaped member 7.

Therefore, the following problems are caused.

(1) During rearward tilting, the first wedge-shaped member 5 is pressed and moved in a clockwise direction (wedge pull-out direction).

Since all of the force (F) applied to the engagement position is applied to the first wedge-shaped member 5, an operating force to overcome a large static friction force is required in order to move the first wedge-shaped member 5 which is being stationary.

However, once the first wedge-shaped member 5 starts to move in the clockwise direction, the second wedge-shaped member 7 in unloaded condition where load is not applied is easily moved in the clockwise direction in response to the movement of the first wedge-shaped member 5 (there is no resistance against the movement). Therefore, there is a problem that the seat back is going to fall rearward all at once.

In addition, once the first wedge-shaped member 5 starts to move, just an operating force to overcome a small dynamic friction resistance is sufficient and a subsequent operating force is sharply reduced.

The present invention has been made to solve the above problems, and an object thereof is to provide a reclining device that prevents a seat back from falling rearward all at once when the seat back is tilted backward.

Solution to Problem

In order to achieve at least one of the objects described above, a reclining device according to one aspect of the present invention includes: an external gear, which has external teeth formed at an outer surface and is provided in one of a seat cushion and a seat back, wherein one of a circular hole and a cylinder centered on a rotation axis of the external teeth is formed in the external gear; an internal gear, which has internal teeth engaged with the external teeth and having the number of teeth greater than that of the external teeth and is provided in the other of the seat cushion and the seat back, wherein the cylinder, which is centered on the rotation axis of the internal teeth and which is inserted into the circular hole, is formed in the internal gear in a case where the circular hole is formed in the external gear, and wherein the circular hole, which is centered on the rotation axis of the internal teeth and into which the cylinder is inserted, is formed in the internal gear in a case where the cylinder is formed in the external gear; a first wedge-shaped member and a second wedge-shaped member, which are provided to be movable along a circumferential direction, between an inner surface of the circular hole and an outer surface of the cylinder; and an urging member, which is locked to the first wedge-shaped member and the second wedge-shaped member and urges the first wedge-shaped member and the second wedge-shaped member in a direction in which the internal teeth of the internal gear and the external teeth of the external gear are engaged, wherein a load from the seat back is simultaneously applied to the first wedge-shaped member and the second wedge-shaped member.

Other features of the present invention will become more apparent from a embodiment for carrying out the invention to be described below and the accompanying drawings.

Advantageous Effects of Invention

According to the present invention, the load from the seat back is intended to be applied to the first wedge-shaped member and the second wedge-shaped member.

Therefore, in the case where the seat back is tilted rearward, load from the seat back is also applied to the other wedge-shaped member (second wedge-shaped member) when one (first wedge-shaped member) of the wedge-shaped members moves in a pull-out direction, unlike the prior art. Thus, the other wedge-shaped member is less likely to move in response to the movement of the one of the wedge-shaped members, as compared to the prior art. In this way, the other wedge-shaped member serves as a suitable brake, so that the seat back is prevented from falling rearward all at once.

Other effects of the present invention will become more apparent from description of the embodiment to be described below and the accompanying drawings.

BRIEF DESCRIPTION OF THE DRAWINGS

FIG. 8 is an enlarged view of the drive ring, a first wedge-shaped member and a second wedge-shaped member shown in FIG. 7.

FIG. 9 is a view for explaining the operation from the state shown in FIG. 8.

FIG. 13 is a configuration view for explaining a conventional reclining device.

FIG. 14 is a view for explaining a force applied to the reclining device shown in FIG. 13.

DESCRIPTION OF EMBODIMENTS

An embodiment of the present invention will be described with reference to the drawings.
(First Embodiment)

Figure 10:
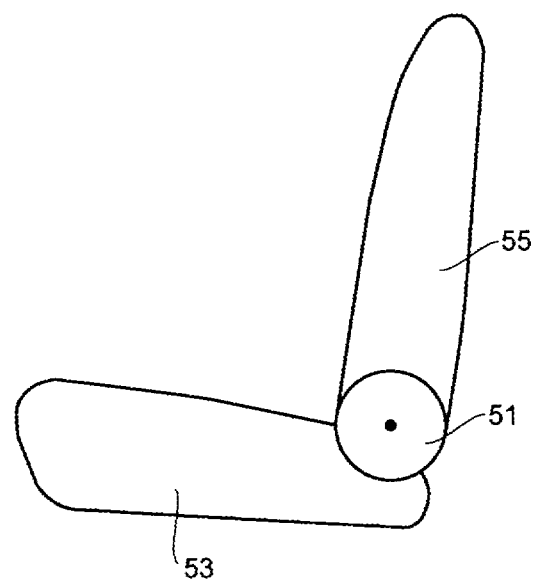
FIG. 10 is a side view of a main part of a seat to which the reclining device of the embodiment is assembled.

First, a seat equipped with a reclining device of an embodiment will be described with reference to FIG. 10. FIG. 10 is a side view of a main part of the seat to which the reclining device of the embodiment is assembled.

As shown in FIG. 10, a reclining device 51 is provided between a seat cushion 53 and a seat back 55.

Figure 1:
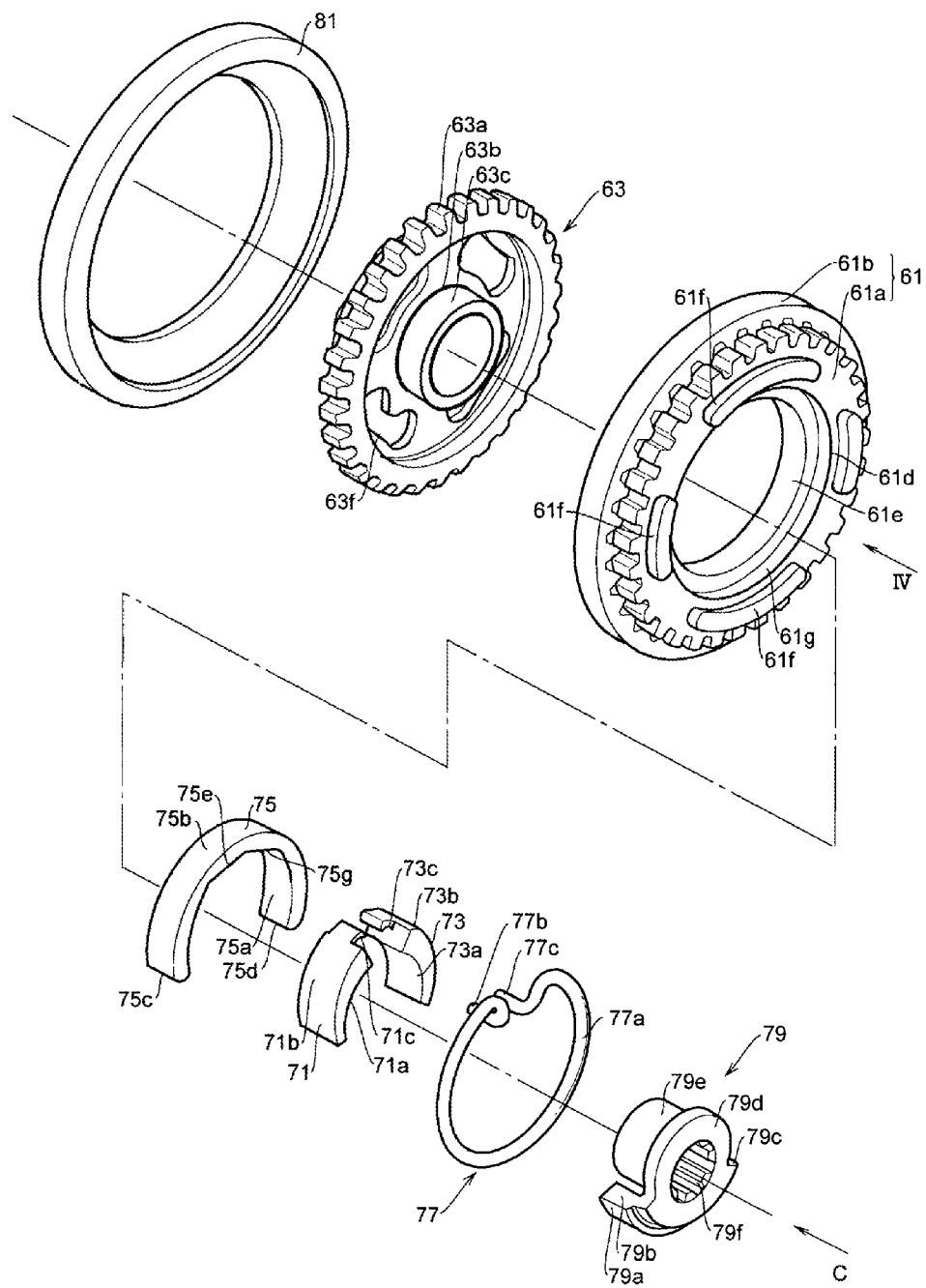
FIG. 1 is an exploded perspective view of a reclining device of a first embodiment.
Figure 4:
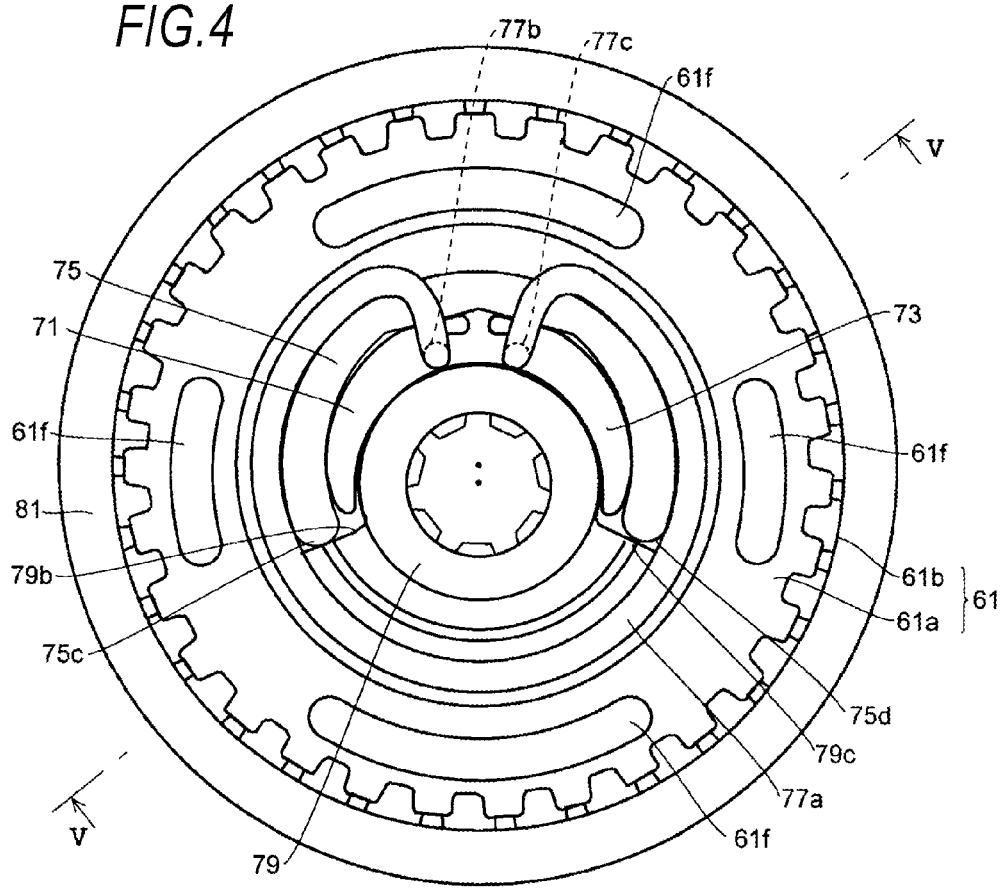
FIG. 4 is an assembled front view of the reclining device shown in FIG. 1, as seen from a direction of an arrow IV.
Figure 5:
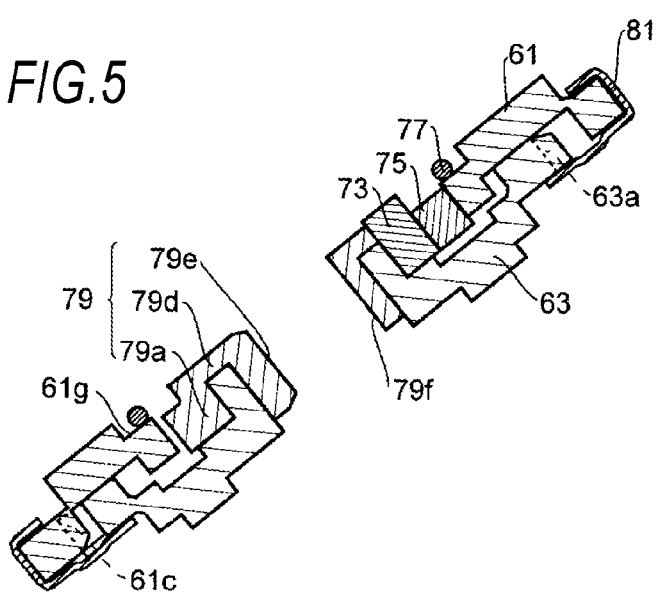
FIG. 5 is an end view taken along a cut line V-V shown in FIG. 4.
Figure 6:
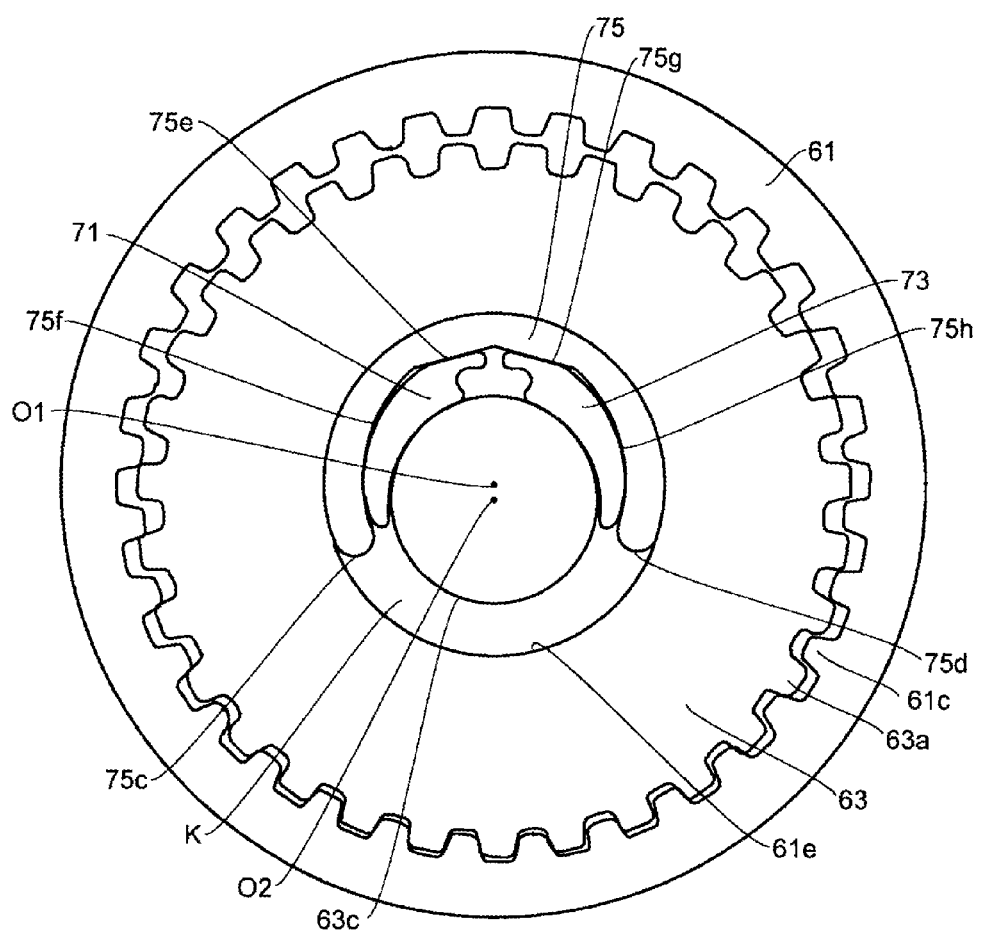
FIG. 6 is a view for explaining a locked state of a lock device shown in FIG. 1.

Next, the reclining device 51 is described with reference to FIG. 1 and FIGS. 3 to 5. FIG. 1 is an exploded perspective view of the reclining device of the embodiment, FIG. 3 is an exploded perspective view of the reclining device shown in FIG. 1, as seen from the opposite direction, FIG. 4 is an assembled front view of the reclining device shown in FIG. 1, as seen from a direction of an arrow IV, FIG. 5 is an end view taken along a cut line V-V shown in FIG. 4, and FIG. 6 is a view for explaining a locked state of a lock device shown in FIG. 1.

Figure 3:
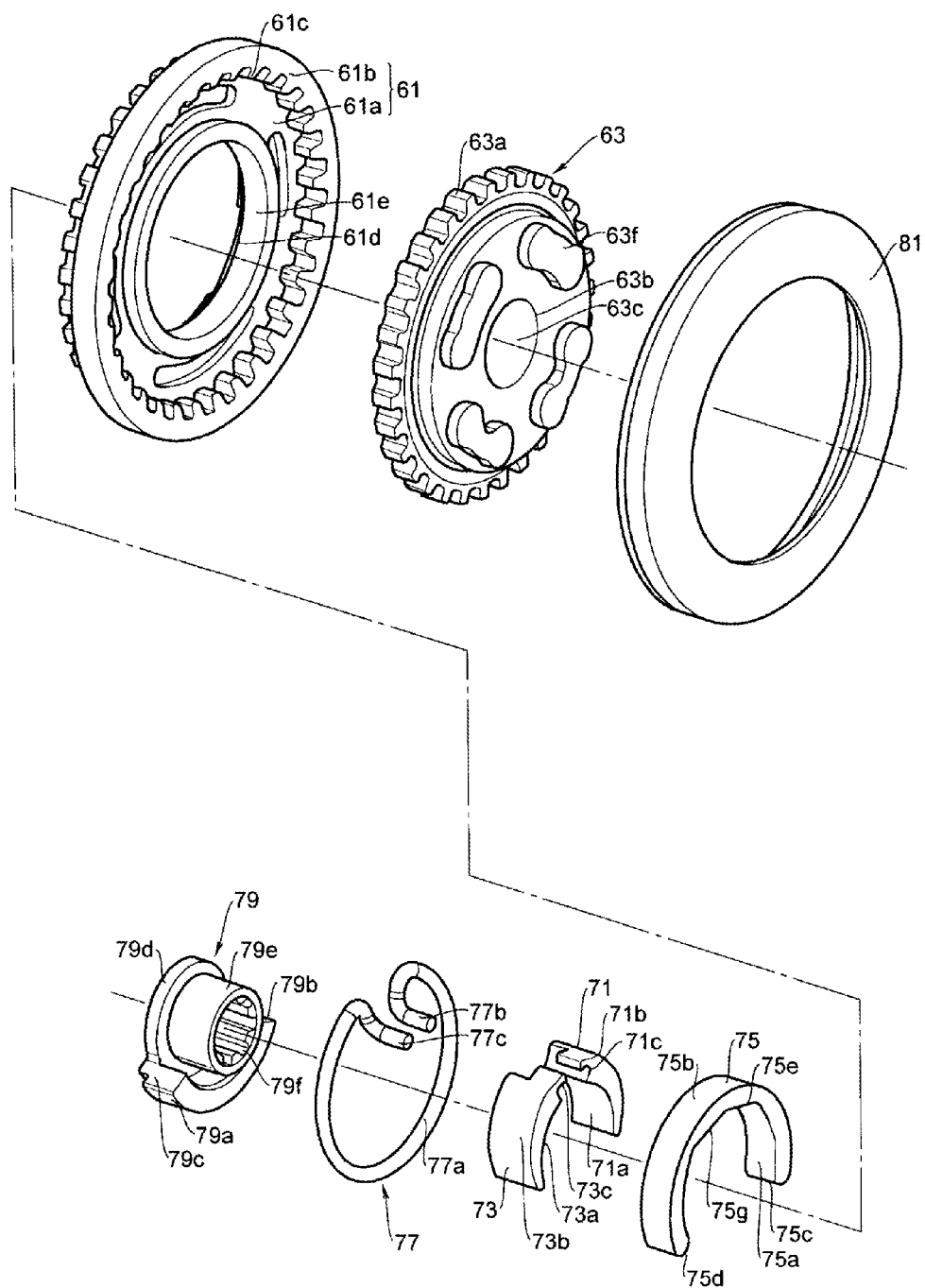
FIG. 3 is an exploded perspective view of the reclining device shown in FIG. 1, as seen from the opposite direction.

As shown in FIG. 3, an internal gear 61 is a bottomed cylindrical member, which is opened at one end and has a circular bottom 61a and a cylindrical upright wall 61b formed along a peripheral portion of the bottom 61a. Internal teeth 61c are formed over the entire portion in a circumferential direction of an inner peripheral surface of the upright wall 61b. Further, a through hole 61d (circular hole) is formed at the center of the bottom 61a of the internal gear 61. A cylindrical upright wall 61e protruding to an opening side is formed along an inner peripheral surface of the hole 61d.

As shown in FIG. 1, four arc-shaped convex portions 61f are formed on an outer surface of the bottom 61a of the internal gear 61. Four arc-shaped holes are formed in a frame of the seat cushion 53 with being corresponding to the convex portions 61f. The convex portions 61f of the internal gear 61 are fitted into these holes, and the fitting portion of both is fixed by a method such as welding or crimping, so that the internal gear 61 is attached to the seat cushion 53.

As shown in FIG. 3, an external gear 63 is disposed inside the bottomed cylindrical internal gear 61. External teeth 63a are formed over the entire portion in a circumferential direction of an outer surface of the external gear 63. The external teeth 63a of the external gear 63 can be engaged with the internal teeth 61c of the internal gear 61. The number of teeth of the external teeth 63a of the external gear 63 is set to be smaller than the number of the internal teeth 61c of the internal gear 61.

A through hole 63b is formed at the center of the external gear 63. On the surface of the external gear 63 facing the internal gear 61, a cylindrical upright wall 63c protruding toward the internal gear 61 is formed along an edge of the hole 63b. An outer diameter of the cylindrical upright wall 63c is set to be smaller than an inner diameter of the cylindrical upright wall 61e of the internal gear 61. The cylindrical upright wall 63c of the external gear 63 serves as a cylinder which is inserted into the cylindrical upright wall 61e (circular hole) of the internal gear 61.

As shown in FIG. 3, four convex portions 63f are formed on the outer surface of the external gear 63. Four holes are formed in a frame of the seat back 55 with being corresponding to the convex portions 63f. The convex portions 63f of the external gear 63 are fitted into these holes, and the fitting portion of both is fixed by a method such as welding or crimping, so that the external gear 63 is attached to the seat back 55.

As shown in FIG. 6, in the state where the external teeth 63a of the external gear 63 is engaged with the internal teeth 61c of the internal gear 61, a rotation axis (the center of the cylindrical upright wall 61e (circular hole)) O1 of the internal gear 61 and a rotation axis (the center of the cylindrical upright wall 63c) O2 of the external gear 63 do not coincide with each other, but are eccentrically arranged. Therefore, an eccentric annular space K is formed between an inner surface of the cylindrical upright wall 61e (circular hole) of the internal gear 61 and an outer surface of the cylindrical upright wall 63c (cylinder) of the external gear 63.

As shown in FIGS. 4 and 6, a first wedge-shaped member 71 and a second wedge-shaped member 73 are provided in the eccentric annular space K. Further, a drive ring 75 is provided in the eccentric annular space K. The first wedge-shaped member 71 and the second wedge-shaped member 73 are clamped by the drive ring 75 and the outer surface of the cylindrical upright wall 63c (cylinder) of the external gear 63. The first wedge-shaped member 71, the second wedge-shaped member 73 and the drive ring 75 are arranged to be movable along the circumferential direction in the eccentric annular space K.

As shown in FIGS. 1 and 3, the first wedge-shaped member 71 and the second wedge-shaped member 73 have a plane-symmetrical shape about an imaginary surface along an up-down direction of the paper surface. An inner surface 71a of the first wedge-shaped member 71 and an inner surface 73a of the second wedge-shaped member 73 are curved surfaces which have substantially the same curvature as the upright wall 63c of the external gear 63. Further, an outer surface 71b of the first wedge-shaped member 71 and an outer surface 73b of the second wedge-shaped member 73 are curved surfaces which have a curvature greater than that of the inner surface 71a of the first wedge-shaped member 71 and the inner surface 73a of the second wedge-shaped member 73. The first wedge-shaped member 71 and the second wedge-shaped member 73 have a shape whose thickness is varied as a wedge shape.

The drive ring 75 is disposed outside the first wedge-shaped member 71 and the second wedge-shaped member 73. An inner surface 75a of the drive ring 75 has an abutting surface which is abutted against the outer surface 71b of the first wedge-shaped member 71 and the outer surface 73b of the second wedge-shaped member 73 (details will be described later). Further, an outer surface 75b of the drive ring 75 has substantially the same curvature as that of the cylindrical upright wall 61e (circular hole) of the internal gear 61.

As shown in FIG. 6, a circumferential length of the drive ring 75 is set to be slightly longer than a total length in the circumferential direction of the first wedge-shaped member 71 and the second wedge-shaped member 73.

When the first wedge-shaped member 71 and the second wedge-shaped member 73 are moved in directions away from each other, in other words, in directions in which the first wedge-shaped member 71 and the second wedge-shaped member 73 respectively drive a wedge, the internal gear 61 and the external gear 63 are relatively moved in a direction in which the internal teeth 61c and the external teeth 63a are engaged.

As shown in FIGS. 1 and 4, a spring 77 is provided in the first wedge-shaped member 71 and the second wedge-shaped member 73. The first wedge-shaped member 71 and the second wedge-shaped member 73 receive, in directions away from each other, an urging force from the spring 77 which attempts to elastically return in a diameter expansion direction. The spring 77 has an annular portion 77a of one turn, an end portion 77b and an end portion 77c, which are raised from the annular portion 77a. The annular portion 77a is accommodated in a groove 61g formed along an opening of the cylindrical upright wall 61e (circular hole) of the internal gear 61. The end portion 77b is locked to a groove 71c formed in a side end surface of the thick side of the first wedge-shaped member 71, and the end portion 77c is locked to a groove 73c formed in a side end surface of the thick side of the second wedge-shaped member 73.

As shown in FIGS. 1, 3, 4 and 6, an unlocking member 79 has a main body portion 79d, a cylindrical portion 79e, and a cam portion 79a. The cylindrical portion 79e is coupled to the main body portion 79d and is fitted into the cylindrical upright wall 63c of the external gear 63. The cam portion 79a is arranged at a distance from an outer surface of the cylindrical portion 79e and is disposed in the eccentric annular space K.

The unlocking member 79 has a hole 79f coaxial with the rotation axis O2. In addition, in the present embodiment, a serration is applied to an inner surface of the hole 79f and a drive shaft (not shown) is fitted into the hole, so that the drive shaft and the unlocking member 79 are integrally rotated.

The cam portion 79a has a first pressing portion 79b facing a first end surface 75c that is one end surface in the circumferential direction of the drive ring 75. Further, the cam portion 79a has a second pressing portion 79c facing a second end surface 75d that is the other end surface in the circumferential direction of the drive ring 75.

As shown in FIGS. 1, 3 and 4, the internal gear 61 and the external gear 63 are clamped by a connection ring 81 so that the internal gear and the external gear cannot be relatively moved in an axial direction.

Now, the drive ring 75 is described with reference to FIGS. 1, 3 and 6.

Abutting surfaces are formed at two locations of the inner surface 75a of the drive ring 75 and are abutted against the outer surface 71b of the first wedge-shaped member 71. A first location is a first abutting surface 75e which has a planar shape and is abutted against the outer surface 71b in the vicinity of the groove portion 71c of the first wedge-shaped member 71. A second location is a second abutting surface 75f which has a curved shape and is abutted against a leading end side of the first wedge-shaped member 71.

The first abutting surface 75e is formed to not cause a force which cause to move the first wedge-shaped member 71 in a direction, in which the engagement between the internal teeth 61c of the internal gear 61 and the external teeth 63a of the external gear 63 becomes shallow, when the first wedge-shaped member 71 is clamped (locked) by the drive ring 75 and the outer surface of the cylindrical upright wall 63c (cylinder) of the external gear 63.

In the present embodiment, the first abutting surface 75e is formed to cause a force which causes the first wedge-shaped member 71 to move in a direction, in which the internal teeth 61c of the internal gear 61 and the external teeth 63a of the external gear 63 are engaged, when the first wedge-shaped member 71 is clamped by the drive ring 75 and the outer surface of the cylindrical upright wall 63c (cylinder) of the external gear 63.

Further, a gap is provided between the first abutting surface 75e of the drive ring 75 and the outer surface of the cylindrical upright wall 63c of the external gear 63 facing the first abutting surface 75e through the first wedge-shaped member 71. The gap is formed to be gradually wider toward a direction, in which the first wedge-shaped member 71 moves so as to release the engagement between the internal teeth 61c of the internal gear 61 and the external teeth 63a of the external gear 63 (in a direction opposite to the urging direction of the spring 77).

Similarly, abutting surfaces are formed at two locations of the inner surface 75a of the drive ring 75 and are abutted against the outer surface 73b of the second wedge-shaped member 73, which has a plane symmetrical shape with the first wedge-shaped member 71. A first location is a first planar abutting surface 75g which is abutted against the outer surface 73b in the vicinity of the groove portion 73c of the second wedge-shaped member 73. A second location is a second curved abutting surface 75h formed on a leading end side of the second wedge-shaped member 73.

The first abutting surface 75g is formed to not cause a force which causes the second wedge-shaped member 73 to move in a direction, in which the engagement between the internal teeth 61c of the internal gear 61 and the external teeth 63a of the external gear 63 becomes shallow, when the second wedge-shaped member 73 is clamped (locked) by the drive ring 75 and the outer surface of the cylindrical upright wall 63c (cylinder) of the external gear 63.

In the present embodiment, the first abutting surface 75g is formed to cause a force which cause the second wedge-shaped member 73 to move in a direction in which the internal teeth 61c of the internal gear 61 and the external teeth 63a of the external gear 63 are engaged when the second wedge-shaped member 73 is clamped by the drive ring 75 and the outer surface of the cylindrical upright wall 63c (cylinder) of the external gear 63.

Further, a gap is provided between the first abutting surface 75g of the drive ring 75 and the outer surface of the cylindrical upright wall 63c of the external gear 63 facing the first abutting surface 75g through the second wedge-shaped member 73. The gap is formed to be gradually wider toward a direction in which the second wedge-shaped member 73 moves so as to release the engagement between the internal teeth 61c of the internal gear 61 and the external teeth 63a of the external gear 63 (in a direction opposite to the urging direction of the spring 77).

Figure 7:
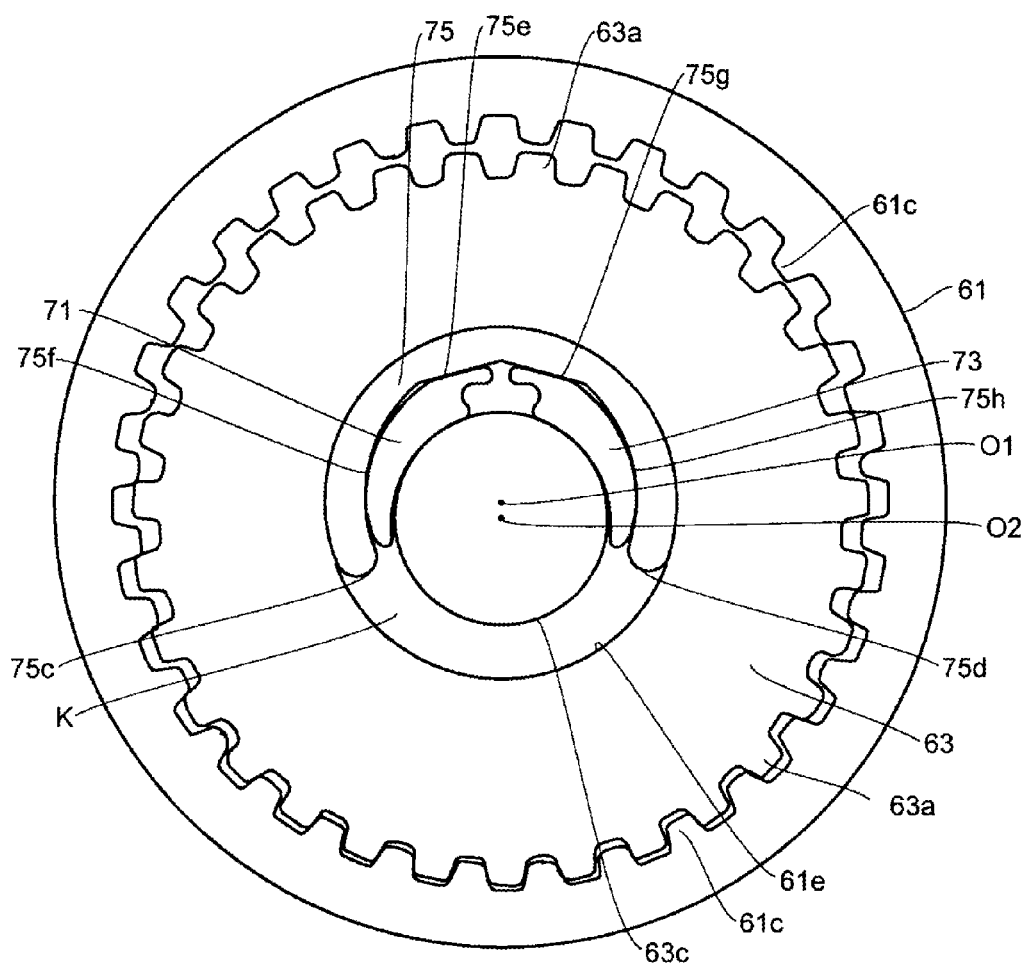
FIG. 7 is a view showing a state where an unlocking member is actuated from the locked state shown in FIG. 6 to rotate a drive ring.

Next, an operation of the above configurations is described with reference to FIGS. 6 to 9. FIG. 7 is a view showing a state where the unlocking member is operated from the locked state shown in FIG. 6 to rotate the drive ring, FIG. 8 is an enlarged view of the drive ring, the first wedge-shaped member and the second wedge-shaped member shown in FIG. 7, and FIG. 9 is a view for explaining the operation from the state shown in FIG. 8.

(Locked State: Non-Operation State)

As shown in FIG. 6, the first wedge-shaped member 71 and the second wedge-shaped member 73 receives, in directions away from each other, an urging force from the spring 77, and thus, presses the outer surface of the upright wall 63c of the external gear 63 and the inner surface of the cylindrical upright wall 61e (circular hole) of the internal gear 61 through the drive ring 75.

As the first wedge-shaped member 71 and the second wedge-shaped member 73 respectively presses the outer surface of the upright wall 63c of the external gear 63 and the inner surface of the cylindrical upright wall 61e (circular hole) of the internal gear 61, the internal gear 61 and the external gear 63 are urged in a direction in which the amount of eccentricity between the rotation axes of both is increased. In this way, the internal teeth 61c of the internal gear 61 and the external teeth 63a of the external gear 63 are deeply engaged, so that the seat back 55 is not tilted.

Further, in this locked state, even when the first wedge-shaped member 71 and the second wedge-shaped member 73 are strongly clamped by the outer surface of the cylindrical upright wall 63c of the external gear 63 and the inner surface 75a of the drive ring 75 due to the load (own weight) from the seat back 55 and the load applied to the seat back 55 from a seated person's back, the first abutting surface 75e and the first abutting surface 75g of the drive ring 75 prevent the occurrence of a force whichs cause the first wedge-shaped member 71 and the second wedge-shaped member 73 to move in a direction, in which the engagement between the internal teeth 61c of the internal gear 61 and the external teeth 63a of the external gear 63 becomes shallow. Therefore, the rattling does not occur in the seat back 55.

(Unlocked State: Operation State)

As shown in FIGS. 7 and 8, when an operation button or an operation handle is operated in the locked state and a drive shaft (not shown) is rotationally driven to the right or left direction, the unlocking member 79 is rotated to the right or left direction. As an example, when the unlocking member 79 is rotated by an angle of θ degrees in a counter-clockwise direction, as seen from a direction of an arrow C in FIG. 1, the second pressing portion 79c of the cam portion 79a presses the second end surface 75d which is the other end surface of the drive ring 75, and thus, the drive ring 75 is rotated to the position of the two-dot chain line.

At this time, as shown in FIG. 8, a gap δ occurs between the first abutting surface 75g of the drive ring 75 and the second wedge-shaped member 73. Therefore, the occurrence of a component force by the first abutting surface 75g is eliminated, and the second wedge-shaped member 73 moves in a pull-out direction, as indicated by the two-dot chain line in FIG. 9. As the second wedge-shaped member 73 moves in the pull-out direction, a press-contact force of the second wedge-shaped member 73 to the outer surface of the upright wall 63c of the external gear 63 and the inner surface of the cylindrical upright wall 61e (circular hole) of the internal gear 61 is weakened, and thus, the engagement between the internal teeth 61c of the internal gear 61 and the external teeth 63a of the external gear 63 becomes shallow. In this way, the seat back 55 becomes a tiltable state.

At the start of movement of the second wedge-shaped member 73, the first wedge-shaped member 71 remains stationary by friction between the outer surface of the cylindrical upright wall 63c of the external gear 63, and the first abutting surface 75e and the second abutting surface 75f of the drive ring 75. However, as shown in FIG. 9, when the second wedge-shaped member 73 moves in the pull-out direction, the first wedge-shaped member 71 is moved by an elastic repulsive force of the spring 77 in a direction in which the wedge is driven into the eccentric annular space K.

As the above operation is repeated, an eccentric state between the internal gear 61 and the external gear 63 is maintained and the engagement location is changed, so that the seat back 55 is tilted rearward.

Meanwhile, as seen from the direction of the arrow C in FIG. 1, the seat back 55 is tilted forward when the unlocking member 79 is rotated in the clockwise direction.

Figure 2:
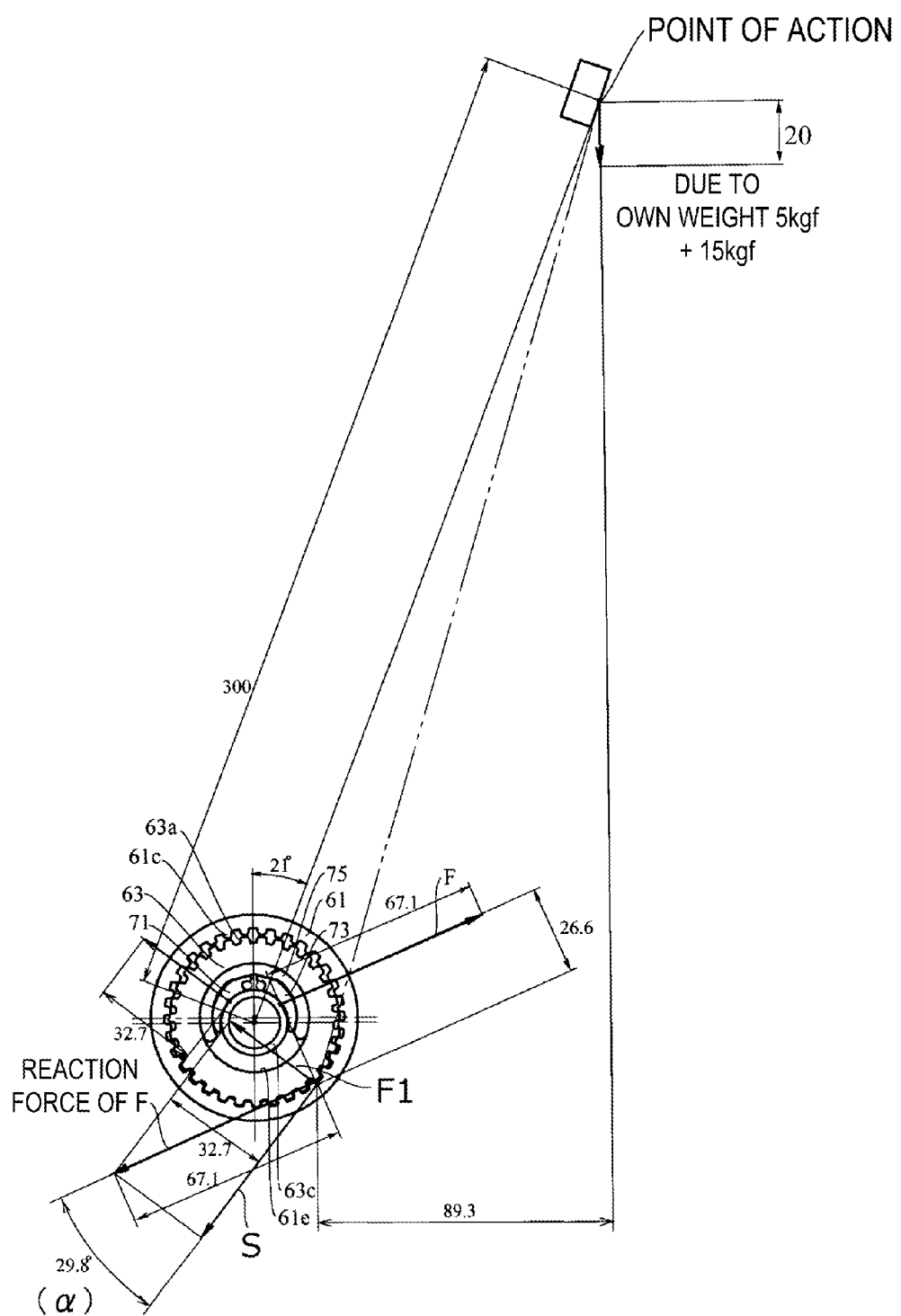
FIG. 2 is a view for explaining a force applied to the reclining device of the first embodiment.

Next, a force applied to the reclining device of the present embodiment is described with reference to FIG. 2. There is an assumed case where:

the external gear 63 (cylinder 63c) is provided in the seat back 55;

the internal gear 61 (hole 61e) is provided in the seat cushion 53;

the seat back 55 is inclined in an angle of 21 degrees rearward from a vertical state;

a vertical downward load applied to the seat back 55 due to its own weight is 5 kgf;

a vertical downward load applied to the seat back 55 due to a seated person is 15 kgf; and a horizontal distance between the engagement position of the external teeth 63a and the internal teeth 61c and a point of action of the load applied to the seat back 55 is 89.3 mm.

In this case, a moment acting on the engagement position of the external teeth 63a and the internal teeth 61c is expressed as 89.3 mm×20 kgf=1786 kgf-mm.

When load is applied in this way, a force which attempts to rotate the external gear 63 in the clockwise direction with respect to the internal gear 61 is applied to the external gear 63.

A force F applied to the internal gear 61 from the second wedge-shaped member 73 can be calculated as follows.

In a direction perpendicular to an acting direction of the force F, a distance between a point of action of the force F and the engagement position of the external teeth 63a and the internal teeth 61c is 26.6 mm as shown. Then, by using the above distance and the above calculated moment of 1786 kgf-mm, which acts on the engagement position of the external teeth 63a and the internal teeth 61c, the force can be calculated as F=1786/26.6=67.1 kgf.

When the force F is applied to the internal gear 61 from the second wedge-shaped member 73, a reaction force of the force F occurs at the engagement position of the external teeth 63a and the internal teeth 61c. It can be considered that the reaction force of the force F is divided into a component S perpendicular to teeth surfaces at which the external teeth 63a and the internal teeth 61c are engaged, and a component F1 parallel to the teeth surfaces. The component S of the reaction force of the force F presses the external teeth 63a and the internal teeth 61c against each other and generates a friction force therebetween. The component F1 of the reaction force of the force F attempts to cause the external teeth 63a and the internal teeth 61c to be slipped over each other. Therefore, in the following description, the component F1 is also referred to as the force F1 to cause slippage.

In the present embodiment, pressure angles of the external teeth 63a and the internal teeth 61c are set such that slippage is caused between the teeth surfaces of the external teeth 63a and the teeth surfaces of the internal teeth 61c when a load from the seat back 55 is applied to the engagement position. Namely, the pressure angles of the external teeth 63a and the internal teeth 61c are set such that the force F1 attempting to cause slippage is greater than the static friction force generated by the component S of the reaction force of the force F.

Specifically, in the example shown, the pressure angles are set such that an angle formed by an acting direction of the reaction force of the force F and an acting direction of the component S of the reaction force of the force F becomes 29.8 degrees. Therefore, the force F1 attempting to cause slippage is expressed as F1=S×tan (29.8 degrees)=S×0.573.

On the other hand, assuming that a coefficient μ of static friction between the external teeth 63a and the internal teeth 61c is 0.2, the static friction force generated by the component S of the reaction force of the force F is expressed as the static friction force generated by the component S of the reaction force of the force F=S×0.2

Thus, in the reclining device according to the present embodiment, the relational expression as the force F1 attempting to cause slippage (=S×0.573)>the static friction force (=S×0.2) is established.

Further, the pressure angles are set such that slippage is caused between the teeth surfaces of the external teeth 63a and the teeth surfaces of the internal teeth 61c when the load from the seat back 55 is applied to the engagement position.

That is, in the reclining device according to the present embodiment, assuming that an angle formed by an acting direction of the reaction force of the force F generated at the engagement position of the external teeth 63a and the internal teeth 61c and a direction perpendicular to the teeth surfaces at the engagement position of the external teeth 63a and the internal teeth 61c is defined as α (29.8 degrees in the example shown in FIG. 2) and a coefficient of static friction between the external teeth 63a and the internal teeth 61c is defined as μ, the relational expression as tan(α)>μ is established.

However, the force attempting to cause the external teeth 63a and the internal teeth 61c to be slipped over each other is received by the first wedge-shaped member 71 being abutted against an inner peripheral surface of the hole 61e of the internal gear 61. Actually, the external teeth 63a and the internal teeth 61c are not slipped over each other. That is, even when the external gear 63 attempts to move with respect to the internal gear 61, a relative movement between the external gear 63 and the internal gear 61 is prevented because the first wedge-shaped member 71 presses the inner peripheral surface of the hole 61e of the internal gear 61.

In this way, in the reclining device of the present embodiment, the load from the seat back 55 is simultaneously applied to the first wedge-shaped member 71 and the second wedge-shaped member 73. That is, the load (force) from the seat back 55, which is applied to the engagement position, is transmitted in this order in the path of the cylinder 63c of the external gear 63, the first wedge-shaped member 71 and the second wedge-shaped member 73, the hole 61e of the internal gear 61, and the seat cushion 53.

Meanwhile, in the conventional reclining device explained in FIGS. 13 and 14, the force attempting to cause the internal teeth 15a and the external teeth 17a to be slipped is less than the maximum static frictional force. Therefore, at first, the external teeth 63a and the internal teeth 61c do not attempt to be slipped. As a result, as described above, the load is received between the first wedge-shaped member 5 and the external gear 17, and the load is not transmitted between the second wedge-shaped member 7 and the external gear 17.

Thus, in the present embodiment, the load from the seat back 55 is applied to the first wedge-shaped member 71 and the second wedge-shaped member 73. According to this configuration, the following effects are obtained.

(1) In the case where the seat back 55 is tilted rearward, the load from the seat back 55 is also applied to the first wedge-shaped member 71 as the other wedge-shaped member when the second wedge-shaped member 73 as one of the wedge-shaped members moves in the pull-out direction, unlike the prior art. Thus, the first wedge-shaped member 71 as the other wedge-shaped member is (resists the movement) less likely to move in response to the second wedge-shaped member 73 as one of the wedge-shaped members, as compared to the prior art. In this way, the first wedge-shaped member 71 serves as a suitable brake, so that the seat back 55 is prevented from falling rearward all at once.

In the case where the above relational expression is established at least when the seat is locked, the effect that the seat back 55 is prevented from falling rearward all at once is obtained. Meanwhile, the above relational expression is normally established because the force F is constantly applied by the own weight of the seat back 55.

(Second Embodiment)

Figure 11:
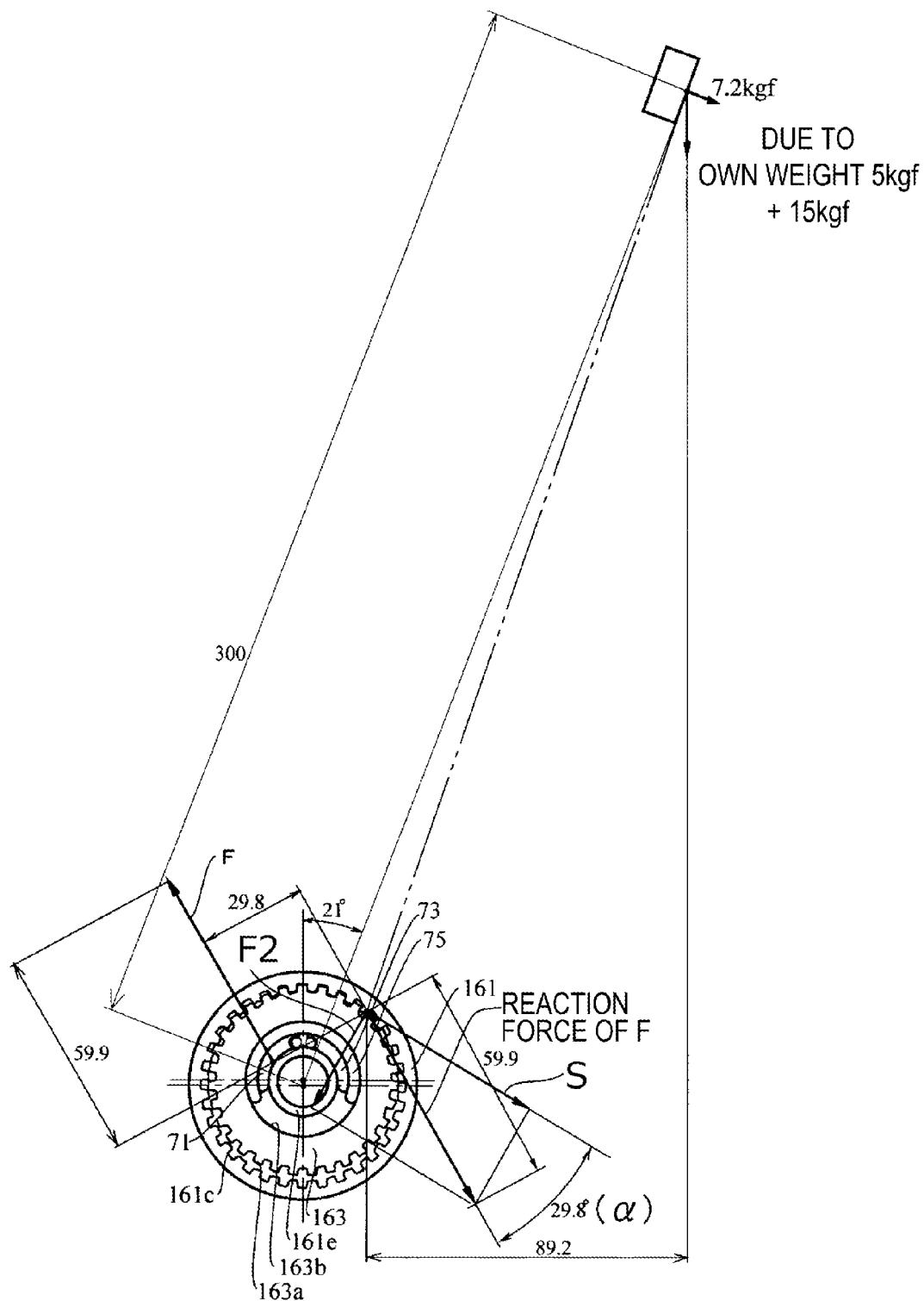
FIG. 11 is a view for explaining a force applied to a reclining device of a second embodiment.
Figure 12:
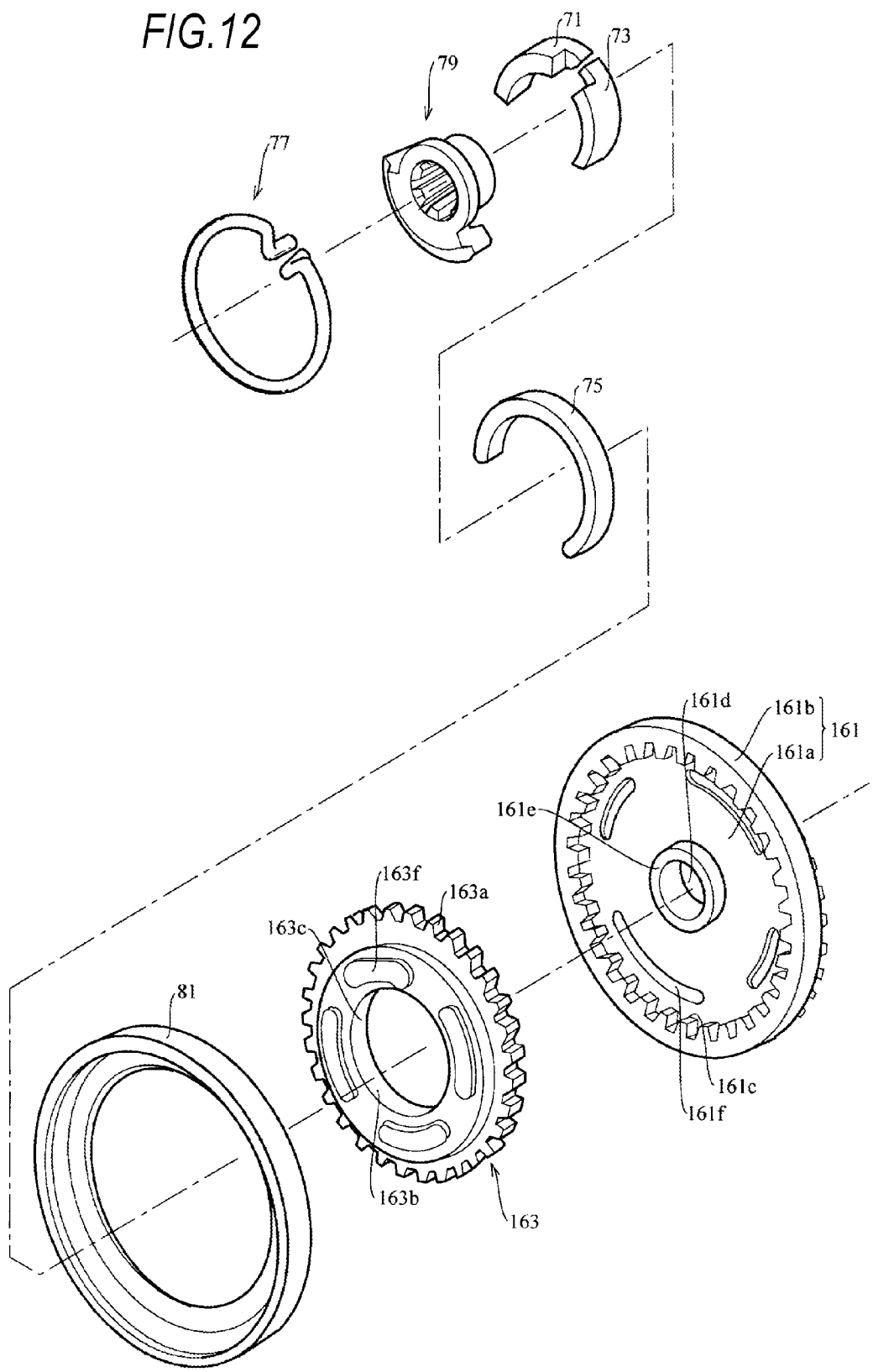
FIG. 12 is an exploded perspective view of the reclining device of the second embodiment.

A reclining device according to a second embodiment of the present invention is described with reference to FIGS. 11 and 12. FIG. 11 is a view for explaining a force applied to the reclining device of the second embodiment, and FIG. 12 is an exploded perspective view of the reclining device of the second embodiment.

First, a configuration of the reclining device of the second embodiment is described with reference to FIG. 12. Meanwhile, the present embodiment is different from the first embodiment in configurations of an internal gear and an external gear, and the other parts are the same. Accordingly, the same parts are denoted by the same reference numerals, and a duplicated description thereof is omitted.

An internal gear 161 of the present embodiment is a bottomed cylindrical member which is opened at one end and has a circular bottom 161a and a cylindrical upright wall 161b formed along a peripheral portion of the bottom 161a.

Internal teeth 161c are formed over the entire portion in a circumferential direction of an inner peripheral surface of the upright wall 161b. Further, a through hole 161d is formed at the center of the bottom 161a of the internal gear 161. A cylindrical upright wall 161e protruding to an opening side is formed along an inner peripheral surface of the hole 161d.

Four arc-shaped convex portions 161f are formed on an outer surface of the bottom 161a of the internal gear 161. Four arc-shaped holes are formed in a frame of the seat back 55 with corresponding to the convex portions 161f. The convex portions 161f of the internal gear 161 are fitted into these holes, and the fitting portion of both is fixed by a method such as welding or crimping, so that the internal gear 161 is attached to the seat back 55.

An external gear 163 is disposed inside the bottomed cylindrical internal gear 161. External teeth 163a are formed over the entire portion in a circumferential direction of an outer surface of the external gear 163. The external teeth 163a of the external gear 163 can be engaged with the internal teeth 161c of the internal gear 161. The number of teeth of the external teeth 163a of the external gear 163 is set to be smaller than the number of the internal teeth 161c of the internal gear 161.

A through hole 163b is formed at the center of the external gear 163. On the surface of the external gear 163 facing the internal gear 161, a cylindrical upright wall 163c protruding toward the internal gear 161 is formed along an edge of the hole 163b. An inner diameter of the cylindrical upright wall 163c is set to be larger than an outer shape of the cylindrical upright wall 161e of the internal gear 161. The cylindrical upright wall 161e of the internal gear 161 serves as a cylinder which is inserted into the cylindrical upright wall 163c (circular hole) of the external gear 163.

Four convex portions 163f are formed on the outer surface of the external gear 163. Four holes are formed in a frame of the seat cushion 53, with corresponding to the convex portions 163f. The convex portions 163f of the external gear 163 are fitted into these holes, and the fitting portion of both is fixed by a method such as welding or crimping, so that the external gear 163 is attached to the seat cushion 53.

Further, similar to the first embodiment, in the state where the external teeth 163a of the external gear 163 is engaged with the internal teeth 161c of the internal gear 161, a rotation axis (the center of the cylindrical upright wall 161e (circular hole)) of the internal gear 161 and a rotation axis (the center of the cylindrical upright wall 163c) of the external gear 163 do not coincide with each other, but are eccentrically arranged. Therefore, an eccentric annular space is formed between an outer surface of the cylindrical upright wall 161e (cylindrical hole) of the internal gear 161 and an inner surface of the cylindrical upright wall 163c (circular hole) of the external gear 163.

As shown in FIG. 11, similar to the first embodiment, the first wedge-shaped member 71, the second wedge-shaped member 73 and the drive ring 75 are provided in the eccentric annular space.

In the first embodiment, the internal gear 61 is attached to the seat cushion 53, and the external gear 63 is attached to the seat back 55. However, in the present embodiment (second embodiment), the internal gear 161 is attached to the seat back 55 and the external gear 163 is attached to the seat cushion 53.

Therefore, in the first embodiment, the seat back 55 is tilted rearward when the second wedge-shaped member 73 moves in the pull-out direction, and the seat back 55 is tilted forward when the first wedge-shaped member 71 moves in the pull-out direction. That is, the rotation direction of the wedge-shaped members is opposite to the tilt direction of the seat back 55.

On the other hand, in the present embodiment, the seat back 55 is tilted forward when the second wedge-shaped member 73 moves in the pull-out direction, and the seat back 55 is tilted rearward when the first wedge-shaped member 71 moves in the pull-out direction. That is, the rotation direction of the wedge-shaped members coincides with the tilt direction of the seat back 55.

Next, a force applied to the reclining device of the present embodiment is described with reference to FIG. 11.

There is an assumed case where:
the external gear 163 (hole 163b) is provided in the seat cushion 53;
the internal gear 161 (cylinder 161e) is provided in the seat back 55;
the seat back 55 is inclined in an angle of 21 degrees rearward from a vertical state;
a vertical downward load applied to the seat back 55 due to its own weight is 5 kgf;
a vertical downward load applied to the seat back 55 due to a seated person is 15 kgf; and
a horizontal distance between the engagement position of the external teeth 163a and the internal teeth 161c and a point of action of the load applied to the seat back 55 is 89.2 mm.

In this case, a moment acting on the engagement position of the external teeth 163a and the internal teeth 161c is expressed as 89.2 mm×20 kgf=1784 kgf-mm.

When a load is applied in this way, a force which attempts to rotate the internal gear 161 in the clockwise direction with respect to the external gear 163 is applied to the internal gear 161.

A force F applied to the external gear 163 from the first wedge-shaped member 71 can be calculated as follows.

In a direction perpendicular to an acting direction of the force F, a distance between a point of action of the force F and the engagement position of the external teeth 163a and the internal teeth 161c is 29.8 mm as shown. Therefore, by using the above distance and the above calculated moment of 1784 kgf-mm, which acts on the engagement position of the external teeth 163a and the internal teeth 161c, the force can be calculated as F=1784/29.8=59.9 kgf.

When the force F is applied to the external gear 163 from the first wedge-shaped member 71, a reaction force of the force F occurs at the engagement position of the external teeth 163a and the internal teeth 161c. It can be considered that the reaction force of the force F is divided into a component S perpendicular to teeth surfaces at which the external teeth 163a and the internal teeth 161c are engaged, and a component F2 parallel to the teeth surfaces. The component S of the reaction force of the force F presses the external teeth 163a and the internal teeth 161c against each other and generates a friction force therebetween. The component F2 of the reaction force of the force F attempts to cause the external teeth 163a and the internal teeth 161c to be slipped over each other. Therefore, in the following description, the component F2 is also referred to as the force F2 to cause slippage.

In the present embodiment, pressure angles of the external teeth 163a and the internal teeth 161c are set such that slippage is caused between the teeth surfaces of the external teeth 163a and the teeth surfaces of the internal teeth 161c when a load from the seat back 55 is applied to the engagement position. Namely, the pressure angles of the external teeth 163a and the internal teeth 161c are set such that the force F2 attempting to cause slippage is greater than the static friction force generated by the component S of the reaction force of the force F.

Specifically, in the example shown, the pressure angles are set such that an angle formed by an acting direction of the reaction force of the force F and an acting direction of the component S of the reaction force of the force F becomes 29.8 degrees. Therefore, the force F2 attempting to cause slippage is expressed as F2=S×tan(29.8 degrees)=S×0.573.

On the other hand, assuming that a coefficient μ of static friction between the external teeth 163a and the internal teeth 161c is 0.2, the static friction force generated by the component S of the reaction force of the force F is expressed as F=S×0.2

Thus, in the reclining device according to the present embodiment, the relational expression as the force F2 attempting to cause slippage (=S×0.573)>the static friction force (=S×0.2) is established.

Further, the pressure angles are set such that slippage is caused between the teeth surfaces of the external teeth 163a and the teeth surfaces of the internal teeth 161c when the load from the seat back 55 is applied to the engagement position.

That is, in the reclining device according to the present embodiment, assuming that an angle formed by an acting direction of the reaction force of the force F generated at the engagement position of the external teeth 163a and the internal teeth 161c and a direction perpendicular to the teeth surfaces at the engagement position of the external teeth 163a and the internal teeth 161c is defined as α (29.8 degrees in the example shown in FIG. 11) and a coefficient of static friction between the external teeth 163a and the internal teeth 161c is defined as μ, the relational expression as $\tan(\alpha) > \mu$ is established.

However, the force attempting to cause the external teeth 163a and the internal teeth 161c to be slipped over each other is received by the second wedge-shaped member 73 being abutted against an inner peripheral surface of the hole 163b of the external gear 163. Actually, the external teeth 163a and the internal teeth 161c are not slipped over each other. That is, even when the external gear 163 attempts to move with respect to the internal gear 161, a relative movement between the external gear 163 and the internal gear 161 is prevented because the second wedge-shaped member 73 presses the inner peripheral surface of the hole 163b of the external gear 163.

In this way, in the reclining device of the present embodiment, the load from the seat back 55 is simultaneously applied to the first wedge-shaped member 71 and the second wedge-shaped member 73. That is, the load (force) from the seat back 55, which is applied to the engagement position, is transmitted in this order in the path of the cylinder 161e of the internal gear 161, the first wedge-shaped member 71 and the second wedge-shaped member 73, the hole 163b of the external gear 163, and the seat cushion 53.

Thus, in the present embodiment, the load from the seat back 55 is applied to the first wedge-shaped member 71 and the second wedge-shaped member 73. With this configuration, the following effects are obtained.

(1) During rearward tilting, the load from the seat back 55 is also applied to the second wedge-shaped member 73 as the other wedge-shaped member when the first wedge-shaped member 71 as one of the wedge-shaped members moves in the pull-out direction, unlike the prior art. Thus, the second wedge-shaped member 73 as the other wedge-shaped member is (resists the movement) less likely to move in response to the first wedge-shaped member 71 as one of the wedge-shaped members, as compared to the prior art. In this way, the second wedge-shaped member 73 serves as a suitable brake, so that the seat back 55 is prevented from falling rearward all at once.

In the case where the above relational expression is established at least when the seat is locked, the effect that the seat back 55 is prevented from falling rearward all at once is obtained. Meanwhile, the above relational expression is normally established because the force F is constantly applied by the own weight of the seat back 55.

The present invention is not limited to the above embodiments. In the configuration of the above embodiments, one of the first wedge-shaped member 71 and the second wedge-shaped member 73 is moved by the drive ring 75 and the other thereof is moved by the spring 77. However, the drive ring 75 may be eliminated, and the first wedge-shaped member 71 and the second wedge-shaped member 73 may be directly moved.

Further, in the first embodiment, the external gear may be attached to the seat cushion and the internal gear may be attached to the seat back. Further, in the second embodiment, the internal gear may be attached to the seat cushion and the external gear may be attached to the seat back.

This application is based upon Japanese Patent Application (Patent Application No. 2013-190315) filed on Sep. 13, 2013, and the entire contents of which are incorporated herein by reference.

INDUSTRIAL APPLICABILITY

According to the present invention, there is provided a reclining device that prevents a seat back from falling rearward all at once when the seat back is tilted backward.

REFERENCE NUMERALS LIST

61 Internal Gear
61c Internal Teeth
63 External Gear
63a External Teeth
71 First Wedge-shaped Member
73 Second Wedge-shaped Member
75 Drive Ring

The invention claimed is:

1. A reclining device comprising:
an external gear, which has external teeth formed at an outer surface and is provided in one of a seat cushion and a seat back, wherein one of a circular hole and a cylinder centered on a rotation axis of the external teeth is formed in the external gear;
an internal gear, which has internal teeth engaged with the external teeth and having the number of teeth greater than that of the external teeth and is provided in the other of the seat cushion and the seat back, wherein the cylinder, which is centered on a rotation axis of the internal teeth and which is inserted into the circular hole, is formed in the internal gear in a case where the circular hole is formed in the external gear, and wherein the circular hole, which is centered on the rotation axis of the internal teeth and into which the cylinder is inserted, is formed in the internal gear in a case where the cylinder is formed in the external gear;
a first wedge-shaped member and a second wedge-shaped member, which are provided to be movable along a circumferential direction, between an inner surface of the circular hole and an outer surface of the cylinder; and
an urging member, which is locked to the first wedge-shaped member and the second wedge-shaped member and urges the first wedge-shaped member and the second wedge-shaped member in a direction, in which the internal teeth of the internal gear and the external teeth of the external gear are engaged,
wherein a load from the seat back is simultaneously applied to the first wedge-shaped member and the second wedge-shaped member.

2. The reclining device according to claim 1, wherein a pressure angle of the internal teeth and the external teeth are set at an angle such that teeth surfaces of the internal teeth and teeth surfaces of the external teeth are slipped by load from the seat back.

3. The reclining device according to claim 1, wherein the cylinder is formed in the external gear.

\* \* \* \* \*